Aug. 7, 1934.                 W. M. LANAGAN                    1,968,838
                              WIND INDICATOR
                           Filed March 19, 1931          2 Sheets-Sheet 1
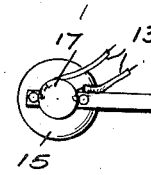
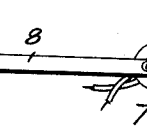
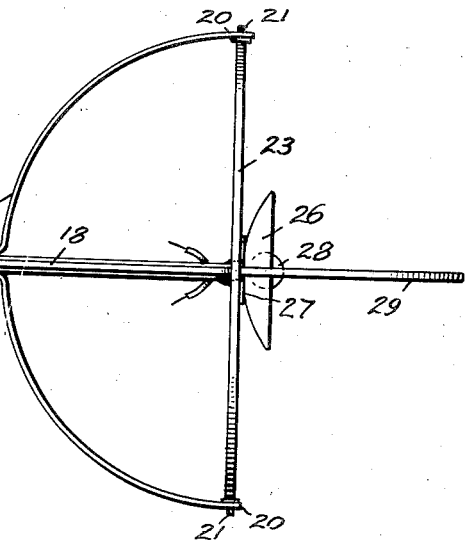
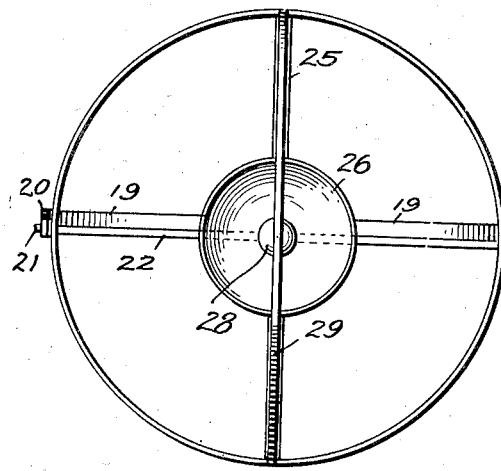
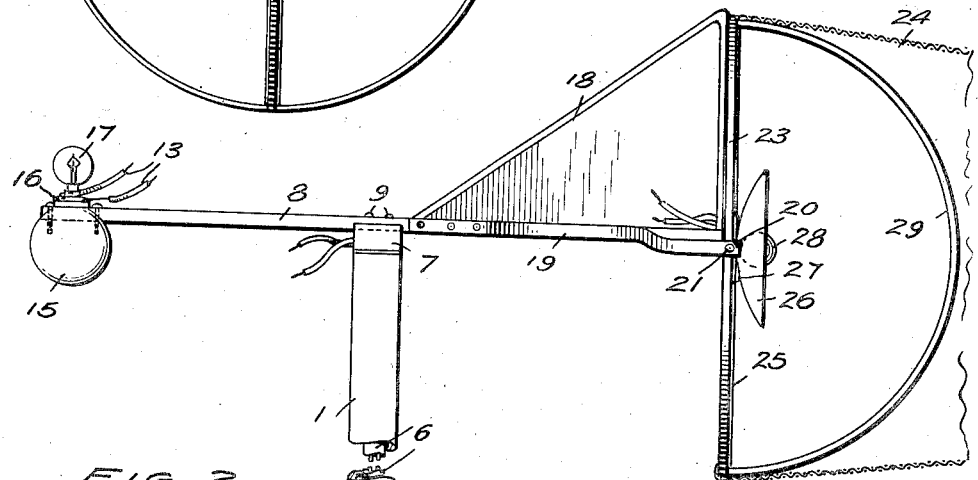
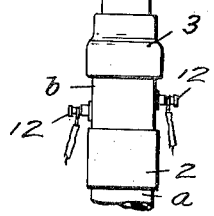
INVENTOR
WILLIAM M. LANAGAN
BY Robert H. Young
ATTORNEY Aug. 7, 1934.        W. M. LANAGAN        1,968,838
                      WIND INDICATOR
               Filed March 19, 1931    2 Sheets-Sheet 2
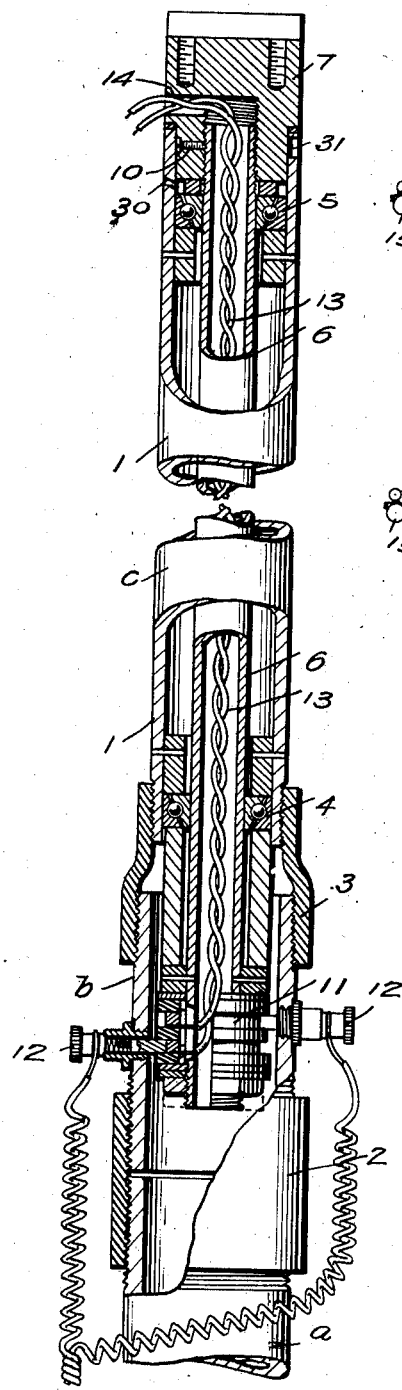
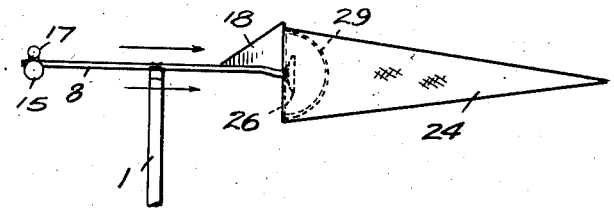
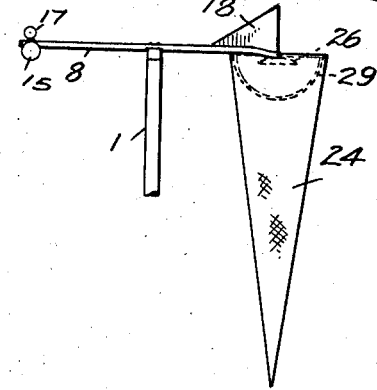
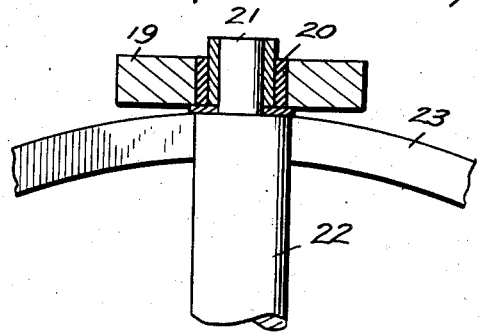
INVENTOR
WILLIAM M. LANAGAN
BY Robert H. Young
ATTORNEY Patented Aug. 7, 1934

1,968,838

UNITED STATES PATENT OFFICE 1,968,838

WIND INDICATOR

William M. Lanagan, Rantoul, Ill.

Application March 19, 1931, Serial No. 523,842

3 Claims. (Cl. 73—55)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in wind indicators of the type customarily installed at landing fields for indicating to aviators the velocity and direction of the wind and the essential object of the improvements is to provide an electrically illuminated, non-fouling, wind velocity and direction indicator which is highly sensitive to slightest changes in wind direction and indicative of wind variance from any angle at a very great distance, and under all conditions.

Other objects of the invention are first to provide an indicator of the wind cone type which permits the use of an unstiffened cone which floats freely in the wind and which retains its "cone shape" under all conditions of wind velocity; second, to shield all bearing and other moving parts against the elements while providing adequate means of lubrication, and third, to make possible the use of electricity as a means of illumination in all positions of the cone and as an aid to night flying.

With the above and other objects in view, the invention resides in the novel construction, arrangement and combination of parts hereinafter more fully described and pointed out, with reference to the accompanying drawings, wherein:

Figure 1 is a top view of the indicator;

Figure 2, a side view, and

Figure 3 is a front view of the wind cone hoop;

Figure 4 is a sectional view of the supporting mast;

Figures 5 and 6 are views depicting relative positions of the cone under varying conditions.

Figure 7 is a detail sectional view of one of the axle bearings.

The invention embodies a supporting assembly including a vertically disposed mast 1 composed of pipe sections $a$, $b$ and $c$ joined together by a coupling 2 and a reducer 3 to form a cylindrical tube within the upper section $c$ of which is rotatably supported, upon relatively upper and lower radial thrust bearing assemblies 4 and 5, a hollow shaft 6. At the upper end of this shaft which protrudes slightly above the outside tube, a cap 7 is provided for holding a horizontal cross bar 8, the latter being secured to the cap by threaded fastenings 9 and the cap being threadedly engaged with the shaft and locked in position by a set screw 10. At the lower end of the hollow shaft are located collector rings 11 consisting of alternate contact and insulating rings or washers, the contact rings of which are constantly in electrical connection with an outside source of current supply by means of two contact brushes 12 and 12' provided in pipe section $b$. Conductors 13 lead from the contact rings and on the inside of the inner hollow shaft 6 to a point directly beneath the horizontal cross bar 8 where the cap 7 is provided with an opening 14 to permit the conductors to be extended out along the cross bar for connecting the lights at either end in parallel.

At one end of the cross bar is mounted a counter weight 15 and a weather proof electric light socket 16 containing a lamp bulb 17 colored red, Secured to the opposite end is a vertically disposed wind vane 18, and a horizontally disposed yoke or U-shaped hanger 19 of spring steel. The yoke may be composed of sections and the arms thereof are provided with trunnion bearings 20 in which are journaled the trunnions 21 of a trunnion shaft 22. This shaft extends diametrically of and has secured thereto a ring or hoop 23 to which is laced a conventional chrome yellow flexible fabric wind cone 24. The ring is thus mounted in the yoke that it can rotate freely from the vertical to horizontal positions. Moreover, the ring and cone are detachable by flexing the yoke arms outwardly to disengage the bearings from the trunnions. Bracing and reinforcing the hoop at right angles to the axle or trunnion shaft thereof is a diametrically extending rod or strip 25 and secured to the shaft and rod at the center of the hoop is a reflector 26, a weather proof electric lamp socket 27 and a lamp bulb 28 so located that the rays of the light are at all times reflected on the inside and the full length of the wind cone. Being laced to a metal ring which is permitted to rotate from the vertical position in a high wind to the horizontal position in a calm, the fabric cone never loses its "cone shape" and the light which illuminates the transparent cone is so placed in the mouth of the cone and covered in such a manner by the reflector that the direct rays of the light are not discernible from any position, thereby eliminating the possibility of temporarily blinding the pilot of any aircraft flying near the cone at night. This feature insures complete illumination of the indicator at all times and prolongs the life of the cone due to complete ventilation of the same, especially in rainy weather. The fabric cone is prevented from contacting at any time with the lamp bulb by means of a bridge or guard 29 consisting of a vertically disposed arcuate rod secured to the wind cone hoop so as to span the lamp and extending into the mouth of the cone.

The wind cone and hoop are secured to the cross bar at a distance removed from the mast to prevent the fabric cone, when hanging limp, from contacting with the mast assembly, to avoid fouling and thereby reducing wear and tear. Of the two lights incorporated in the device, the red light 17 serves as an obstacle light as well as an indication of the pivotal point from which the wind cone, illuminated by the other light 28, is floating. The two principal bearings are of the conventional ball type and are enclosed within the mast housing so as not to be exposed to the elements. These parts are lubricated from the outside through suitable oil ports 30 and the upper section c of the mast is provided with an opening 31 for adjusting the cap-locking set screw 10. The various units of the wind cone frame are preferably joint welded.

From the foregoing it will be seen that the invention provides a wind velocity and direction indicator which is simple in operation, economic in construction, and which functions efficiently and accurately at all times and under all conditions.

Having thus described the invention, what is claimed as new is:

1. A wind indicator including a yoke, a supporting member for the yoke rotatable about a vertical axis, a hoop journaled in said yoke for rotation about a horizontal axis, a wind cone of light-transmitting flexible material having the larger end secured to said hoop, illuminating means mounted on the hoop and disposed inwardly of the cone, and guard means carried by the hoop and bridging the illuminating means.

2. A wind indicator having, in combination, an unstiffened flexible fabric wind cone, a supporting hoop secured within the mouth of the wind cone, a pair of ring-bracing members secured to and disposed diametrically of the ring and crossing each other at right angles, illuminating means secured to said ring-bracing members at their point of crossing and facing inwardly of the wind cone, and means for preventing the fabric cone when hanging limp from contacting with the illuminating means.

3. A wind indicator including a horizontally rotatable member, a hoop mounted thereon for rotation in a vertical plane, a flexible fabric wind cone secured to said hoop, illuminating means on said hoop for internally lighting said cone, and a transversely disposed arcuate member secured to said hoop so as to bridge the illuminating means and extending into the mouth of the cone to prevent the fabric of the latter from contacting with the said illuminating means.

WILLIAM M. LANAGAN.